Oct. 12, 1954     W. SCHAELCHLIN     2,691,751
MOTOR CONTROL SYSTEM Filed May 29, 1952     3 Sheets-Sheet 1

Fig.1.

WITNESSES:     INVENTOR
Walter Schaelchlin.
BY
ATTORNEY

Oct. 12, 1954

W. SCHAELCHLIN 2,691,751

MOTOR CONTROL SYSTEM

Filed May 29, 1952

WITNESSES:
E. A. McCloskey
E. F. Oberhein

INVENTOR
Walter Schaelchlin.
BY
Paul E. Friedemann
ATTORNEY

Fig.3a.

Patented Oct. 12, 1954

2,691,751

UNITED STATES PATENT OFFICE 2,691,751

MOTOR CONTROL SYSTEM

Walter Schaelchlin, Buffalo, N. Y., assignor to Westinghouse Electric Corporation, East Pittsburgh, Pa., a corporation of Pennsylvania Application May 29, 1952, Serial No. 290,636

14 Claims. (Cl. 318—45)

This invention relates, generally, to electric motor control systems and, more in particular, to such systems of control embodying one or more electric motors.

In certain types of electric drives, the horsepower requirements of the load are sufficiently large that two and sometimes more electric motors are required to develop the necessary torque or horsepower. An application of this type is represented in certain of the newer wind tunnel drives wherein supersonic air speeds are to be obtained through a relatively large test section of the wind tunnel. The compressor which circulates the air in such a wind tunnel is necessarily large, and it is usually not feasible to build a single motor of sufficient capacity to drive the compressor.

In a particular application representing one embodiment of this invention, four 45,000 horsepower motors having their rotors connected to a common shaft were required to drive a compressor for a wind tunnel. The control problems existing in such a drive are numerous.

This will be evident upon a consideration of the compressor characteristics. The horsepower requirement of the compressor varies essentially as the cube of the speed. As a consequence, from zero speed up to a certain minimum speed, the load on the driving motors is relatively small and good speed regulation over this range is usually difficult to achieve.

As the motors accelerate, the power requirement of the compressor increases considerably. In view of the size of this electric drive, means must be provided to limit the accelerating currents which may occur in the respective motors in order to avoid overloading the power system or systems from which the electric drive receives its power. Additionally, it is usually desirable to regulate the power output of the drive within certain limits during the accelerating period in order to achieve a degree of system stability. Speed regulation is another factor which is desirable in such a system in order to obviate the possibility of system overloading due to excessive rates of change of speed.

Electrical systems for controlling motor drives of the character hereinabove referred to have often in the past embodied D.-C. control components, for example, a plurality of D.-C. machines. One such type of drive employs four D.-C. machines the armatures of which are connected in a loop and two of which are driven by an A.-C. machine which is connected in the secondary winding circuit of one of the alternating-current driving motors. The other pair of D.-C. machines is driven by a constant-speed A.-C. motor.

This arrangement represents a variable speed drive under the control of a suitable speed regulator receiving its intelligence in part from a tachometer generator driven at a speed proportional to the speed of the alternating-current motors. In operation, this D.-C. system functions as a load-absorbing unit during a predetermined portion of the operating cycle of the alternating-current drive system and thereafter may be switched through suitable control connections to provide a certain portion of the power requirement for driving the load. A load-measuring device, which is inserted in the D.-C. loop circuit, measures the D.-C. load which is a function of the A.-C. load so that at a predetermined load the remaining alternating-current drive motors of the system may be regulated to provide more power for controlling the system load. A D.-C. control of this type functions essentially as a speed regulator until at maximum speed it assumes its share of the total mechanical load on the motors.

In view of the extensive use of D.-C. rotating machinery in the regulating and control branch in this system, the over-all system cost is quite high. Moreover, the maintenance cost, in view of the number of components involved, may also be relatively high.

Accordingly, it is one object of this invention to provide a system of speed control for two or more mechanically interconnected motors, which is simple in its elements with respect to operational requirements and positive in operation.

Another object of this invention is to provide a system of speed control for two or more mechanically interconnected motors of relatively large horsepower wherein one motor functions as a load-absorbing unit or dynamic load brake during a portion of the operating cycle.

More specifically stated, it is an object of this invention to provide a system of speed control for two or more mechanically connected alternating-current induction motors wherein one of the motors is operated as a load brake during part of the operating cycle.

Yet another object of this invention is to provide an electrical drive of the character referred to in the preceding object wherein one motor is operated as an A.-C. generator during part of the operating cycle from zero speed up to a given speed and then operated as an A.-C. motor to aid in driving the connected load.

It is also an object of this invention to provide a system of control according to the preceding object wherein automatic control of one motor, from operation as an A.-C. generator to operation as an A.-C. motor, is obtained.

The foregoing statements are merely illustrative of the various aims and objects of this invention. Other objects and advantages will become apparent upon a study of the following specification when considered in conjunction with the accompanying drawing, in which:

As briefly noted hereinbefore, one application of this invention is in the drive of a wind tunnel compressor having a maximum power requirement of about 180,000 H. P. This power requirement may be divided among four 45,000 H. P. motors connected to a common shaft which, in turn, is connected to the input shaft of the compressor. The motors involved are of the wound rotor induction type having suitable means for controlling the secondary winding circuit resistance to achieve variations in speed. In view of the size of these motors, liquid rheostats are utilized to control the secondary circuit resistance.

The torque of such a compressor varies substantially as the square of the compressor speed. Hence, over the low speed range, the torque loading of the drive is very small, and regulator stability over this low torque range is difficult to achieve. In the simplified drive herein illustrated, adequate torque load is obtained by utilizing one of the main drive motors as a dynamic load brake during the accelerating period over the low speed range up to a predetermined minimum speed, at which time the load brake function of that motor is eliminated and suitable circuits established, whereby this motor may be utilized as a drive motor to aid in supplying input power to the compressor.

The three remaining motors of this drive are simultaneously speed controlled through simultaneous variation of their secondary circuit resistances by means of a common regulator drive. Load sharing among these three motors with such an arrangement is accomplished by adjusting the relative positions of the electrodes of the responsive liquid rheostats so that at small electrode separation the loads are balanced. Inasmuch as a common sump tank is utilized for the liquid rheostats of the respective motors, the electrolyte in the respective liquid rheostats is at the same temperature and concentration. Thus, the problem of load balance is minimized. Load division is not difficult for wide electrode separation because of the steep speed torque curves of the wound-rotor type of induction motor.

Figure 1:
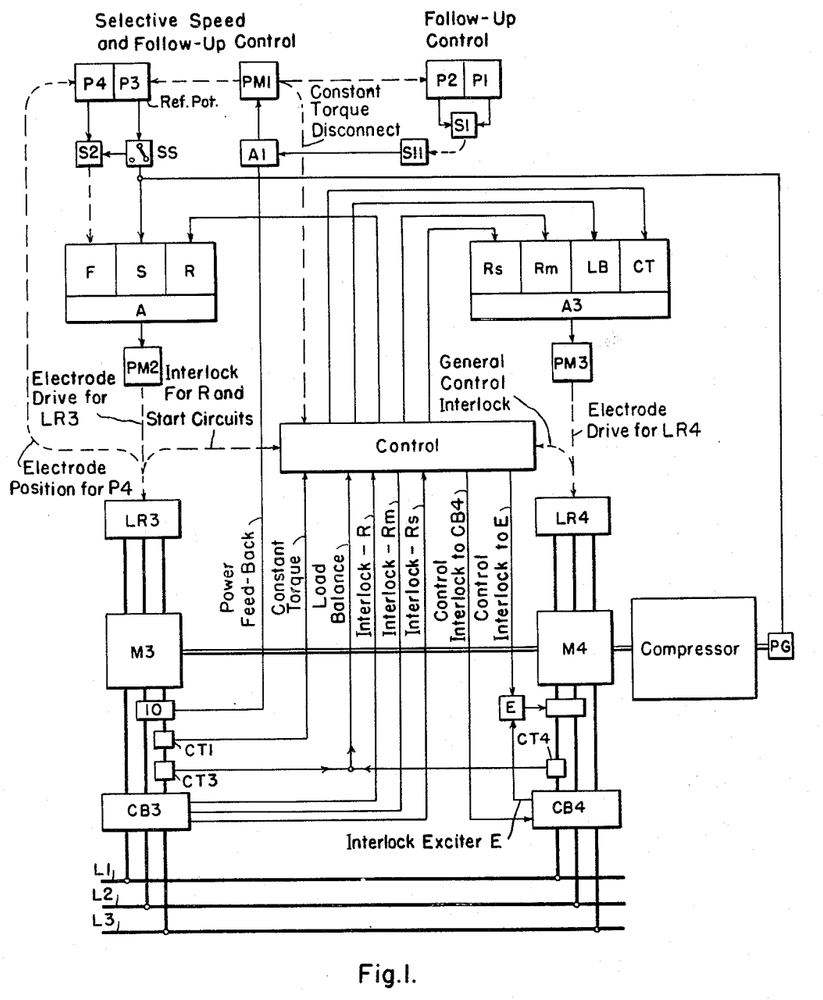
Figure 1 is a block diagram illustrating in an elementary way one embodiment of this invention.

In an effort to simplify the illustration of this invention, the three drive motors which are simultaneously speed regulated by the common regulator have been illustrated as a single motor designated M3 in the block diagram of Fig. 1. In this illustration the motor M4 is utilized as the load brake over the low speed range during the starting cycle of the drive. It will be appreciated that the two motors herein illustrated are sufficient to demonstrate the elementary principles of this invention.

In the illustrated embodiment of this invention, the motors M3 and M4 are connected to a supply of alternating current represented by conductors L1, L2 and L3, by means of respective circuit breakers CB3 and CB4. Circuit breaker CB3 is closed to start the drive. However, during the starting interval, circuit breaker CB4 remains open. The control of a circuit breaker CB4 is separate from that of circuit breaker CB3 and is under the control of the circuit system represented in block form and designated "Control" in Fig. 1. At the time the system is started, the control circuit in conjunction with interlocking through auxiliary contacts on circuit breaker CB4, establishes connections whereby the output of exciter E is applied to one phase of the primary of motor M4. The excitation applied is direct current. Thus, the motor M4 which during this starting period is being driven by motor M3, is operating as an alternating-current generator, the generated voltage of which is dissipated in the liquid rheostat LR4 which controls the resistance of the secondary winding circuit thereof.

Figure 2:
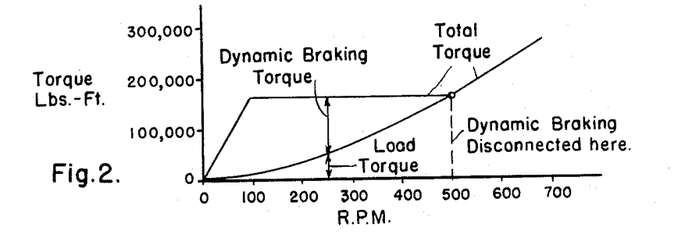
Fig. 2 is a curve illustrating the torque characteristic of the drive over a given speed range, and Figs. 3a and 3b together illustrate details of the system of Fig. 1.

The operating characteristics of the system, for the mentioned application, are illustrated in Fig. 2. From this it will be seen that the dynamic braking torque of machine M4, functioning as a load brake, is added to the load torque of the compressor to produce a total torque over the speed range up to about 500 R. P. M. of about 160,000 pound-feet, which is held substantially constant over the speed range between about 100 R. P. M. and 500 R. P. M. At the time 500 R. P. M. at the compressor is reached, provision is made for automatically eliminating the dynamic braking feature and establishing circuits for switching machine M4 to motor operation. The features whereby this function is achieved appear in the system of Fig. 1 and are described hereinbelow.

The system is controlled by means of a follow-up control circuit embodying a pair of potentiometers P1 and P2 of which potentiometer P1 is manually operated. The difference between the tapped voltages of these respective potentiometers is detected by a polarized sensitive device S1, which mechanically operates a switch S11 which applies a control voltage of the proper polarity to an amplifier A1, the output of which controls a follow-up motor or pilot motor designated PM1. The connection afforded amplifier A1 by switch S11 operates the pilot motor PM1 at a predetermined maximum speed. This motor is utilized to drive the tap of potentiometer P2 into positional correspondence with the tap of the manually operated potentiometer P1, at which time the voltage difference between the mentioned taps is zero and the amplifier circuit established through switch S11 is interrupted, thus stopping the pilot motor. In view of the size of the system, the power demand on the power mains L1, L2 and L3 must be maintained below a predetermined limit to avoid excessively loading the power supply at the time the compressor drive is started. This is accomplished by means of a power feedback having a power pick-off at connection 10 in the supply circuits of the primary of motor M3. This power feedback to amplifier A1 is applied in a negative sense and, therefore, tends to suppress the output of amplifier A1 in an amount sufficient to prevent excessive rates of movement of liquid rheostat LR3.

This latter function is achieved through a selective speed and follow-up control involving a pair of bridge-connected potentiometers P3 and P4 of which potentiometer P3 is driven by the output of pilot motor PM1. The selective speed and follow-up control of this last-named circuit is achieved by means of a selector switch SS which in the position shown provides speed regulation by matching the output of a compressor-driven tachometer or pilot generator PG with the tapped voltage of potentiometer P3 in a differential sense and utilizing the differential voltage thus obtained to control an amplifier A through a speed control input section S of this amplifier. The output of amplifier A is applied to the motor PM2, which drives the moving electrodes of liquid rheostat LR3. Thus, it will be appreciated that the control of amplifier A1, which controls pilot motor PM1, controls the rate of follow-up of potentiometer P3 of the setting of potentiometer P1 and, as a consequence, limits the rate of movement of liquid rheostats LR3 to that rate which will not overload the power supply.

Any instant position of potentiometer P1 with the connection herein described indicates a particular speed of the compressor. Thus, the angular position of the potentiometer P2 correspondingly indicates a particular compressor speed. As a consequence, the angular position of pilot motor PM1, or the number of revolutions this pilot motor has made to drive the tap of potentiometer P2 to a given position, indicates a particular compressor speed. The output of pilot motor PM1 or the angular position of the tap of potentiometer P2 may, therefore, be utilized to provide a control whereby the dynamic braking function may be disconnected and the motor M4 connected as a motor to assist motor M3 in driving the compressor. This is accomplished by the dotted connection identified "Constant Torque Disconnect" which is applied to the control portion of the system. Continuing this discussion in terms of the particular application hereinbefore referred to, this mechanical connection may be utilized to operate suitable switching circuits at the time the compressor speed of 500 R. P. M. is reached to establish circuits whereby the output of exciter E is disconnected from the primary circuit of motor M4 and whereby the circuit breaker CB4 is closed to connect motor M4 to the supply of alternating current.

During the starting cycle of the drive, the constant torque characteristic over the speed range up to 500 R. P. M. is achieved by means of suitable control of the moving electrodes of liquid rheostat LR4. At the time the system is started, the moving electrodes of this liquid rheostat are in their resistance all-out position, that is, they are at minimum separation, unlike the moving electrodes of liquid rheostat LR3 which are at maximum separation so that maximum secondary circuit resistance exists at the time motor M3 is connected to the line. Hence, by the time the system has accelerated to about 100 R. P. M., the dynamic braking torque of machine M4, now functioning as a generator, together with the relatively small load torque of the compressor at this speed, reaches a level of about 160,000 pound-feet. At this point, the moving electrodes must be separated from the stationary electrodes of liquid rheostat LR4 so that the total torque will remain substantially constant. This is accomplished by controlling the pilot motor PM3 which drives the moving electrodes of liquid rheostat LR4 as a function of the primary current of motor M3 which at this time is an indication of the total system torque. The current cue is derived as a voltage taken from a current transformer CT1 associated with one of the primary circuit conductors of motor M3 and applied through the control portion of the system to the constant torque input CT of amplifier A3, affording the proper control of pilot motor PM3 so that the torque is maintained constant up to the time this function of the drive is disconnected.

When machine M4 is connected as a motor as described above, it is necessary that this motor be operated in such a way as to share the compressor load with motor M3. This is done slowly so that abrupt variations of loading of motor M3 will not take place, thus minimizing the regulating problem with respect to motor M3. In accomplishing this, a slow follow-up control for motor M4 is provided by means of a load balance cue derived from the voltages of respective current transformers CT3 and CT4 associated with the respective primary circuits of motors M3 and M4. This load balance cue is applied through the control portion of the system to the load balance input LB of amplifier A3. The control of pilot motor PM3 under this stimulus is maintained sufficiently slow that rapid follow-up of the moving electrodes of liquid rheostat LR4 is obviated. Hence, motor M4 gradually assumes or drops load as indicated by the load balance cue. At the time load sharing is reached, the load balance voltage drops to zero, and motor M3 stops in substantially the correct position to provide load sharing.

Proper operation of the system requires that the moving electrode systems of the respective liquid rheostats be properly positioned at the time the system is started and further requires that the moving electrodes of liquid rheostat LR4 are positioned at maximum separation at the time motor M4 is switched from dynamic braking to motoring. Positioning of the electrodes prior to starting of the system is accomplished, respectively, by an electrode reset designated R in the amplifier controlling motor PM2, which drives the electrodes of liquid rheostat LR3, and an electrode reset RS in the control portion of amplifier A3, which through pilot motor PM3 controls the moving electrodes of liquid rheostat LR4. These circuits are interlocked with auxiliary contacts of circuit breaker CB3 through the control portion of the system so that at the time the system is stopped the moving electrodes of liquid rheostat LR3 are moved to their resistance all-in position, that is, their position of maximum separation, and the moving electrodes of liquid rheostat LR4 are moved to their position of minimum separation or resistance all-out position.

In order to move the moving electrodes of liquid rheostat LR4 to their resistance all-in position at the time the dynamic braking function of machine M4 is disconnected and prior to the connection of this machine as a motor in driving the compressor, provision is made in the control portion of the system by switching means, the operation of which is initiated by the constant torque disconnect drive of motor PM1, to apply a suitable control voltage to the control portion of amplifier A3, which is designated $Rm$, to energize pilot motor PM3 in such sense as to drive the moving electrodes away from the stationary electrodes. By a mechanical interlock designated "General Control Interlock" between the moving electrodes of rheostat LR4 and the control portion of the system, this circuit is interrupted when maximum separation is reached, and through switching in the control portion of the system, circuits are established to connect the load balance control represented in current pick-offs CT3 and CT4 to the load balance portion of amplifier A3. With this arrangement, the changeover of machine M4 from its dynamic braking function to its motoring function is achieved with a minimum disturbance of the main power supply.

For manual operation of the system without the speed regulation, the reference voltage of potentiometer P3, which as earlier noted is connected in a bridge circuit with potentiometer P4, is compared with the output of potentiometer P4, the tap of which is driven by the drive for the moving electrodes of liquid rheostat LR3. Thus, a change of speed setting by the operator at potentiometer P1 advances the reference potentiometer P3 to a corresponding position which, in turn, energizes the follow-up mechanism which is under the control of the polarized sensitive device S2 and operates the liquid rheostats until electrode position corresponds to the new position. This type of operation is achieved by the simple expedient of switching selector switch SS to its second position in which the voltage tapped at potentiometer P3 and that tapped at potentiometer P4 is opposed in the polarized sensitive device S2. The movement of the mechanical parts of this device in a manner similar to the movement of the mechanical parts of device S1, which controls the switch S11, controls suitable switching in the follow-up portion of the input to amplifier A to drive the motor PM2 in the proper direction. A suitable position indicator may be made available to the operator so that he can readily check the position of the liquid rheostats.

Figure 3A:
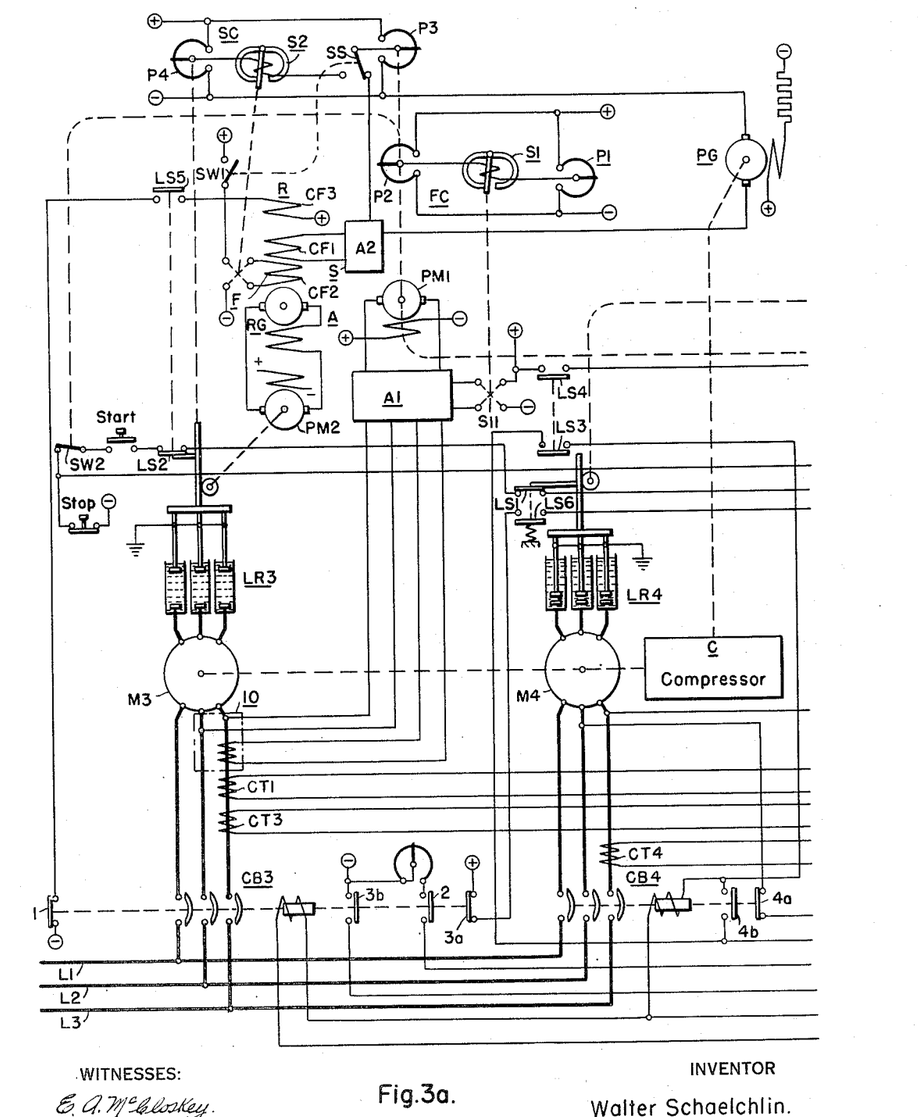
Figure 3B:
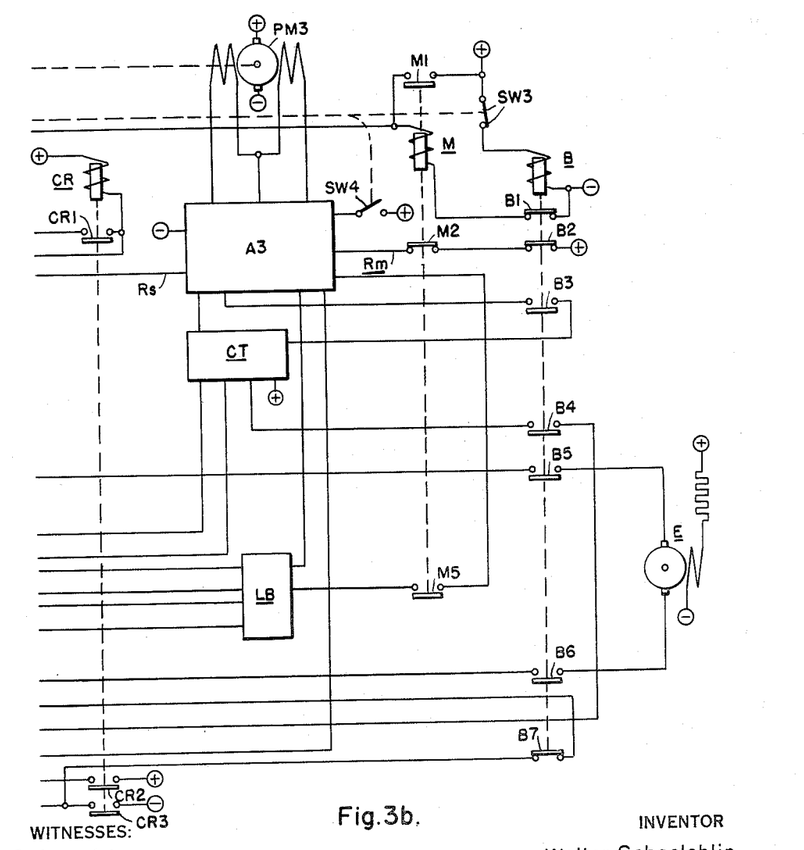

A more detailed understanding of this invention may be had by reference to Figs. 3a and 3b which collectively illustrate certain of the details of this system. In these figures, parts corresponding to those appearing in Fig. 1 have been given like reference characters where feasible. This circuit has been simplified as in Fig. 1 by showing only two motors. Similarly the direct current control voltage supply circuit is not shown in its entirety but is illustrated fragmentarily at points requiring direct current energization.

As in Fig. 1, the rotors of induction motors M3 and M4 are mechanically connected to a common shaft which is connected to the input shaft of the compressor C, motor M3 being used for starting and driving the compressor up to a given speed during which interval the machine M4 functions as a loading brake. When a certain speed is reached or a certain output power requirement reached, the system provides for the connection of the machine M4 as a motor to aid in driving the compressor.

Each of the alternating-current induction motors is adapted for connection to a three-phase supply of alternating current which is represented by conductors L1, L2 and L3. Connection to this common source of supply for each of the three phases of each of the motors is obtained by means of circuit breakers which are respectively designated, generally, CB3 and CB4. Circuit breaker CB3 is controlled by contacts CR2 and CR3 of a control relay CR. This relay is under the control of the Start and Stop push buttons together with certain other switches yet to be described.

The secondary winding circuits of each of the motors may be of the conventional variable impedance type. The variable impedances for the respective secondary winding circuits are represented by the liquid rheostat groups designated LR3 and LR4. These liquid rheostats, while not so illustrated, are conventionally connected to a common sump so that the fluid medium or electrolyte therein, which functions as the resistance medium through which the currents flows, may be continually circulated by means of a suitable pumping system to achieve constant mixing and cooling of the resistance fluid medium. Such a system appears in the copending application of W. Schaelchlin, et al., Serial No. 281,956, filed April 12, 1952, entitled Electrical Apparatus and assigned to the assignee of this invention. Other suitable systems may be employed. The details of such a circulating system have not been shown since they are not essential to an understanding of this invention.

The object in utilizing motor M4 as a load brake when the system is being started, as explained hereinbefore, is to provide a sufficient torque load on the system to obtain stable regulator performance over the low speed range of the compressor. To this end one phase of the primary of motor M4 is excited with direct current and the output appearing in the secondary winding circuit is dissipated in heat generated in the liquid rheostat LR4 forming a part of the secondary winding circuit. The liquid rheostat LR4 is controlled in such a way that the torque of motor M4 now functioning as a loading brake is suitably varied over a major portion of the low speed range to maintain the total torque constant. The system further provides for automatic switch over of the motor M4 from load brake operation to motor operation at the time the speed of the compressor drive reaches about 500 R. P. M.

In order to prevent immediate connection of the motor M4 to the line in the event that the resistance of the liquid rheostat is not all in, to minimize line disturbance, provision is also made to move the moving electrodes of the liquid rheostat LR4 to their resistance all-in position before the operating coil of the circuit breaker CB4 may be operated.

Other provisions for insuring safe operation of the system include a control for preventing movement of the moving electrodes of liquid rheostat LR3 at too high a rate. This control is initiated in the follow-up circuit generally designated FC which is utilized to initiate control of a pilot motor PM1, the output of which is regulated in dependence of the power loading of the primary circuit of motor M3. This pilot generator controls a speed control circuit generally designated SC, the output of which controls a pilot motor PM2 which drives the moving electrodes of liquid rheostat LR3. Thus, the rate at which the moving electrodes may be advanced towards the stationary electrodes of the liquid rheostat is controlled as a function of the power loading. Provision is also made for insuring that the moving electrodes of liquid rheostat LR3 are in their resistance all-in position and the moving electrodes of liquid rheostat LR4 are in their resistance all-out position prior to the starting of the system.

Referring now to the operation and details of the circuit, the operator controls the system by adjustment of the speed controlling potentiometer P1 of the follow-up control circuit FC. When this potentiometer is moved from start position, an unbalance voltage appears between the tap thereof and the tap of reference potentiometer P2. This unbalance voltage energizes a polarized sensitive device S1 such as a polarized relay which controls the contacts S11 in the direct current control circuit of amplifier A which controls the energization of pilot genertaor PM1. This amplifier is differentially controlled by a watt-meter type pick-off generally designated 10 including voltage and current connections in the primary circuit of drive motor M3. This voltage is fed back in such a way as to reduce the output of amplifier A1 and thereby reduce the speed of motor PM1 when the power of the primary circuit of this motor increases beyond a given level. Motor PM1 continues to drive reference potentiometer P2 until such time as the voltage between the taps of the respective potentiometers of the follow-up control circuit is reduced to zero. Motor PM1 also drives the tap of a potentiometer P3 in the speed control circuit SC. The tap of a second potentiometer P4 forming a part of the speed control circuit is driven by movement of the moving electrode system of liquid rheostat LR3 and functions as a follow-up of electrode movement. The speed control circuit is selectively utilized to regulate the compressor speed and to provide a follow-up control which corresponds to a speed setting selected at the manually operated speed potentiometer P1. This selective operation is achieved by means of selector switch SS. This switch is mechanically ganged with a second switch designated SW1 which controls the application of direct current excitation to a control field winding CF2 of a regulating generator RG.

When switch SS is in the position shown, switch SW1 is open and as a consequence field CF2 is deenergized. Control field CF1 of regulating generator RG (amplifier A in Fig. 1) is controlled by the output of an amplifier A2. Control field CF1 and amplifier A2 correspond to the speed control S for amplifier A in Fig. 1. Amplifier A2 is controlled by the difference in voltage between the tap of reference potentiometer P3 and a pilot generator PG which is driven by the compressor at some suitable speed. Thus, the pilot generator voltage is an indication of the speed of the compressor and is matched against the voltage at the tap of potentiometer P3 in the circuits of amplifier A2. The difference of these two voltages therefore appears as an excitation voltage across winding CF1.

The armature winding of regulating generator RG is connected in series with the armature winding of pilot motor PM2, the field of which is connected to a suitable supply of direct current. With the control thus provided the moving electrodes of liquid rheostat LR3 are adjusted at a rate controlled by pilot motor PM1 to bring the speed of the drive motor M3 up to the speed indicated by the setting of the tap of speed potentiometer P1. At this point the system will regulate to maintain the speed of the motor drive at that indicated by the setting at potentiometer P1.

If it is desirable to obtain straight follow-up control selector switch SS is moved to its second position in which polarized sensitive device S2 such as a polarized relay is connected between the taps of potentiometers P3 and P4. This connection corresponds to section F of amplifier A in Fig. 1. With this arrangement the switch SW1 is closed connecting the field CF2 to the supply of direct current. The polarity of this connection is determined by the direction of voltage unbalance between the taps of potentiometers P3 and P4 which is detected by sensitive device S2. Motor PM2 is therefore caused to operate in such a direction in moving the liquid rheostat moving electrodes so that the tap of potentiometer P4 is moved in a direction to balance the voltage appearing at the tap of potentiometer P3, at which time the sensitive device interrupts the field circuit. Since the average follow-up rate is controlled by the pilot motor which moves the tap of potentiometer P3, it will be appreciated that the excitation of field CF2 may be selected at such a level as to cause the follow-up of the tap of potentiometer P4 to slightly lag that of the tap of potentiometer P3 in which case the control may be accomplished with the same apparatus shown and intermittent energization and deenergization of the field which would be caused by too rapid movement of potentiometer P4 avoided, if desired.

The moving electrodes of liquid rheostats LR4 are driven by a pilot motor PM3 controlled by an amplifier A3 which is selectively energized for control purposes by a plurality of different control voltages, taken at selected points in the system, for the purpose of affording proper movement of the moving electrodes of this liquid rheostat. The selection of these voltages is primarily under the control of a braking relay designated B and a motoring relay designated M. The coil of braking relay B is controlled by a cam operated switch SW3 which is driven by the pilot-motor PM1. This cam-operated switch is designed to be closed, for example, at speeds below 500 R. P. M. and to be opened at the time the system speed reaches 500 R. P. M. Such an indication of speed is obtainable from rotation of a gear unit by pilot motor PM1, in view of the fact that this pilot motor drives the tap of potentiometer P2 to a position corresponding to the setting of the tap of speed potentiometer P1 at which the operating speed of the drive is set. As a consequence a selected point along potentiometer P2 corresponds to 500 R. P. M., for example, and this position of the output of the gear driving the tap of potentiometer P2 is then utilizable to operate a cam switch such as SW3 to indicate the speed.

When the direct current control voltage is applied to the system at the time the system is being started, since the switch SW3 is closed, relay B will be energized. When this relay is energized it opens its contacts B1 which are in series with the coil of relay M and thereby prevents relay M from being energized. During the starting interval direct current is to be applied to one phase of the primary circuit of motor M4. This direct current is derived from an exciter E having fixed excitation and is applied through the contacts B5 and B6 of relay B which are closed at this time. This circuit for applying the exciter voltage also includes the interlock contacts 4a operated by circuit breaker CB4. These contacts are closed when the circuit breaker is in its open position and are provided to prevent the application of direct current to the primary of motor M4 in the event circuit breaker CB4 may have been closed.

During the starting cycle of the system as explained in connection with Fig. 2, the torque loading of drive motor M3 is to be maintained at a substantially constant level. Inasmuch as the compressor load is gradually increasing with speed, some measure of the total load must be obtained in order to control the position of the moving electrodes of liquid rheostat LR4 so that motor M4 operating as a load brake will add only the required torque load to maintain the total torque constant. An indication of load current of motor M3 is suitable for this purpose.

To this end the load current of motor M3 is detected by a current transformer CT1 which is connected in one line of the primary circuit of this motor. The voltage obtained is compared with a reference voltage taken from the direct current control voltage supply. The reference voltage is scaled in magnitude to indicate the desired value of torque. These voltages are compared in a suitable circuit of conventional design represented in block CT. The reference voltage is applied through the interlocking contacts 2 of circuit breaker CB3 which are closed when this circuit breaker is closed and through the now closed contacts B4 of brake relay B. The output of the circuit which is indicative of the torque error is applied to the amplifier A3 through the now closed contacts B3 of brake relay B. The polarity of this output voltage applied to the amplifier A3 determines the direction of rotation of the pilot motor. Thus the pilot motor will operate in such a manner in controlling secondary resistance that the motor M4 now operating as a load brake will provide the required additional torque loading for the main drive motor M3 so that good system stability may be obtained over the low speed range.

The amplifier A3 may be energized by a suitable direct current voltage taken from the supply of direct current control voltage and applied through a switch SW4. The switch SW4 illustrated is a cam-operated switch controlled by the output of pilot motor PM1. This cam switch is controlled in such a way that when the tap of the manual speed potentiometer P1 is in the starting position and the tap of the potentiometer P2 is correspondingly indexed by pilot motor PM1 that switch SW4 will be open. Upon movement of the tap of P1 to some operating speed and follow-up movement of the tap of potentiometer P2 due to the drive of the pilot motor PM1, switch SW4 will be closed immediately upon such movement and remain closed until such time as the tap of potentiometer P2 is returned to the initial position. Thus the amplifier is connected only at such times as the system is in operation. Amplifier A3 may be of any suitable type which responds to the polarity and to the magnitude of a direct current control signal.

With the apparatus thus far described the motor PM3 driving the moving electrodes of liquid rheostat LR4 is controlled by the difference between a reference voltage indicative of a predetermined torque which is to be maintained during the starting cycle and a voltage proportional to the primary current of one of the motors which is indicative of the actual system torque. Therefore, the system will always regulate in such a way through movement of the moving electrodes of liquid rheostat LR4 to match the voltage proportional to actual system torque against the reference voltage indicative of a desired system torque.

In keeping with the specific example, when the speed of the compressor drive reaches 500 R. P. M., switch SW3 is opened. At this time relay B is deenergized and disconnects the constant torque control voltage which is applied to the amplifier A3, and at the same time disconnects the exciter E from the primary circuit of motor M4. At this time contacts B1 of the brake relay B close and establish part of an energizing circuit for the coil of relay M. This circuit extends through limit switch contacts LS4 which are closed by the moving electrode system of liquid rheostat LR4 at the time the moving electrodes reach their upper limit of movement. At the time the contacts LS4 close, the energizing circuit for relay M is completed. This interlock with the electrode position is provided so that when the machine M4 is switched from load brake operation to induction motor operation, it will not be possible to effect the switch over until such time as all of the secondary circuit resistance is in. In this manner the connection of motor M4 to the line may be accomplished with a minimum of line disturbance.

To this end amplifier A3 is controlled at this time with a direct current control voltage taken from the direct current control voltage supply circuit and applied through the now closed contacts B2 of brake relay B and contacts M2 of motor relay M which are still closed. This circuit corresponds to control section Rm of amplifier A3 in Fig. 1. The polarity of this voltage is such as to cause motor PM3 to drive the electrodes of liquid rheostat LR4 upwardly as viewed until the limit of movement is reached at which time relay M is energized and contacts M2 in this control voltage circuit are opened to interrupt the flow of the reset control current. This control voltage circuit may also be interlocked with the normally open contacts 3b controlled by the circuit breaker CB3 so that this voltage may not be applied unless the induction motors are operating. This measure, for example, would obviate the possibility of the application of this control voltage at such a time when the system was being stopped at which time the electrodes of liquid rheostat LR4 are to be moved to resistance all-out position as shown in the drawing to ready the system for the next starting cycle.

Energization of relay M closes contacts M1 which shunt the limit switch contacts LS4. At the same time contacts M5 in the control voltage circuit are closed to apply the output of load balance circuit LB to the input of the amplifier A3.

When the moving electrodes of the liquid rheostat LR4 reach their upper limit of movement as described, limit switch contacts LS3 also close. This closes the last of the two contacts in the energizing circuit for the closing coil of circuit breaker CB4, the other contacts being those designated B7. When circuit breaker CB4 closes motor M4 is connected to the supply of alternating current. At this time contacts 4b operated by circuit breaker CB4 close and shunt limit switch contacts LS3 to maintain the energizing circuit for the operating coil independently of the position of the moving electrode system.

Sharing of the load by motor M4 is accomplished by producing a pair of voltages corresponding to the load currents of respective motors M3 and M4 and controlling pilot motor PM3 in accordance with the difference between these two voltages. A conventional comparison circuit represented by the block designated LB is employed for this purpose. In this circuit the voltages of respective current transformers CT3 and CT4 are differentially compared and the rectified output applied through contacts M5 to amplifier A3. With this arrangement a follow-up control for motor M4 is provided. However, this follow-up control is made sufficiently slow that rapid variation of load on motor M3 is avoided, tending to minimize stability problems in the regulating system for motor M3. Thus the system controlling the secondary resistance of the motor M4 always slowly regulates to cause motor M4 to carry its share of the total load.

When the system is deenergized to stop the drive, provision is made for returning the electrodes of liquid rheostat LR3 to their resistance all-in position and at the same time provision is made to drive the moving electrodes of liquid rheostat LR4 to their resistance all-out position. In the drive for the moving electrodes of liquid rheostat LR3 this is accomplished in the provision of an additional control field winding CF3 for regulating generator RG. This corresponds to electrode reset R of Fig. 1. This field winding is energized by a suitable supply of direct current in a circuit including limit switch contacts LS5 and interlock contacts 1 of circuit breaker CB3. When this circuit breaker is open, contacts 1 are closed. During operation of the system the moving electrodes are removed from their resistance all-in position in controlling the speed of motor M3. As a consequence limit switch contacts LS5 are also closed completing the energizing circuit for CF3. The output of regulating generator RG under the influence of control field CF3 rotates motor PM2 in a direction to separate the electrodes of liquid rheostat LR3. When the moving electrodes reach their resistance all-in position limit switch LS5 is opened.

The control for pilot motor PM3 is initiated at the instant that the circuit breakers move to open position through the medium of interlock contacts 3a which are now closed. The control circuit for amplifier A3 extends from the direct current control voltage supply through limit switch contacts LS6 and interlock contacts 3a. Contacts LS6 open only when the moving electrodes of liquid rheostat LR4 occupy their resistance all-out position and consequently at this time will be closed. The polarity of control voltage applied to amplifier A3 causes rotation of pilot motor PM3 in a direction to move the moving electrode system of liquid rheostat LR4 to the resistance all-out position. When this position is reached, the control circuit is interrupted at contacts LS6 and the drive is stopped.

The starting circuit for this system includes the control relay CR which controls the operation of the circuit breakers at contacts CR2 and CR3. The energizing circuit for the coil of control relay CR includes limit switch contacts LS1, limit switch contacts LS2, the Start contacts, cam operated switch SW2 and the Stop contacts to complete the coil circuit across the supply of direct current. Cam operated switch SW2 is closed only when reference or follow-up potentiometer P2 is in its start position and opens at the time motor PM1 operates to follow-up the setting of the tap of potentiometer P1. Switch SW2 remains open until such time as the tap of potentiometer P2 is returned to start position. Limit switch contacts LS2 are closed only when the moving electrodes of liquid rheostat LR3 are in their resistance all-in position and limit switch contacts LS1 are closed only when the electrodes of liquid rheostat LR4 occupy their resistance all-out position. This is the position for the respective moving electrode drives in which the drive may be started.

Assuming that direct current control voltage is applied to the system, the operation of the drive is generally as follows: When the Start push button is depressed, the coil of control relay CR is energized and the contacts CR1 through CR3 close. Contacts CR1 shunt switch SW2 and limit switch contacts LS1 and LS2, maintaining the control relay energized independently of the position of these respective switches. Circuit breaker CB3 now closes and motor M3 begins to rotate. When the direct current control voltage is applied to the system, voltage is applied to the coil of brake relay B through switch SW3. Relay B now closes and applies the constant torque control voltage of circuit CT to the amplifier A3. Relay B also applies the output of exciter E to one phase of the primary circuit of induction motor M4 which now functions as a dynamic load brake on the drive. The manual speed potentiometer is turned to the desired operating speed which causes follow-up motor PM1 to drive the taps of potentiometers P2 and P3 into corresponding positions at a rate controlled in dependence of the power loading of the primary circuit of motor M3. If selector switch SS is in the position shown, the voltage at the tap of potentiometer P3 is gradually matched against the output of pilot generator PG in the input circuits of amplifier A2. The moving electrodes of liquid rheostat LR3 are correspondingly positioned causing the drive system to accelerate. In keeping with the specific example, at 500 revolutions per minute, switch SW3 deenergizes relay B which completes a circuit at contacts B2 in the input to amplifier A3 to cause motor PM3 to move the electrodes of liquid rheostat LR4 to resistance all-in position. Limit switch contacts LS3 in conjunction with contacts B7, now closed, energize the operating coil of circuit breaker CB4 which connects the primary circuit of motor M4 to the alternating current supply and the switch over to motoring operation is completed. The contacts B1 of relay B, which are now closed, complete the circuit for energizing relay M through contacts LS4 and the motoring relay closes to apply the load balance control through circuit LB to the input of amplifier A3 and the slow follow-up control for the moving electrodes of liquid rheostat LR4 is established.

The system is stopped by depressing the stop push-button which immediately opens all of the circuit breakers. At this time pilot motor PM2 returns the moving electrodes of liquid rheostat LR3 to their resistance all-in position and pilot motor PM3 returns the moving electrodes of liquid rheostat LR4 to their resistance all-out position. This latter control is obtained through the connection of the control voltage to amplifier A3 by the simultaneously closed contacts 3a and LS6. Limit switches LS5 and LS6 respectively stop the movement of the respective moving electrodes when these electrodes reach their initial positions. In order to reset the drive so that the system may be started again, the tap of potentiometer P1 must be returned to its start position. At this time the taps of reference potentiometers P2 and P3 are returned to their initial positions at which time the output of the drive of pilot motor PM1 closes switch SW2 in the control circuit for relay CR to reestablish the starting connection for the drive.

Although but one application of this invention has been illustrated and described herein, it will be appreciated by those skilled in the art that this invention is not necessarily limited in application to compressors or, for that matter, to mechanical loads having characteristics corresponding to those of compressors, but may be connected substantially to any type of a mechanical load. Moreover, it will be appreciated by those skilled in the art that numerous changes in circuit details can be made. For example, the character of the regulators which are employed, the character of the impedances or resistances of the secondary winding circuits of the induction motors, and the character of the various load or current-sensing devices and devices responsive to speed which have been herein illustrated may all be changed, without departing from the spirit and scope of this invention. Additionally, the various automatic functions may be practiced manually. Accordingly, it is intended that the foregoing disclosure and the illustrations of the drawings shall be considered only as illustrative and not interpreted in a limiting sense.

I claim as my invention:

1. In a motor control system, the combination of, a first induction motor having a primary and secondary winding, a second induction motor having a primary and secondary winding, each induction motor having a rotor, a shaft connecting the rotors, circuit connections for applying alternating current to the primary winding of the first motor, circuit connections for applying direct current to the primary winding of the second motor, a first variable impedance device connected to the secondary winding of the first motor, a second variable impedance device connected to the secondary winding of the second motor, said first variable impedance means being of substantially maximum impedance initially and said second variable impedance means being of substantially minimum impedance initially, and first means and second means for controlling said first and said second variable impedance means, respectively; each of said first means and said second means being responsive to an operating quantity of said motors and controlling said variable impedance means in opposite senses.

2. In a system for controlling an induction motor over a given speed range, the combination of a, first induction motor having a primary winding and a variable impedance secondary winding circuit, a second induction motor having a primary winding and a variable impedance secondary winding circuit, each induction motor having a rotor, a shaft connecting the rotors, circuit connections for applying alternating current to the primary winding of the first induction motor to operate said first induction motor as a motor, circuit connections for applying direct current to the primary winding of the second induction motor to operate said motor as a load-absorbing alternating-current generator, and means for varying the impedances of said variable impedance secondary winding circuits, decreasing the impedance of the variable impedance secondary circuit of the first induction motor and increasing the impedance of the variable impedance secondary winding circuit of the second motor.

3. In a system for controlling an induction motor over a given speed range, the combination of, a first induction motor having a primary winding and a variable impedance secondary winding circuit, a second induction motor having a primary winding and a variable impedance secondary winding circuit, each induction motor having a rotor, a shaft connecting the rotors, circuit connections for applying alternating current to the primary winding of the first induction motor to operate said first induction motor as a motor, circuit connections for applying direct current to the primary winding of the second induction motor to operate said motor as a load absorbing alternating-current generator, a movable member for each secondary winding circuit for varying the impedance thereof, the movable member for the secondary winding circuit of the first induction motor being in substantially maximum impedance position and the movable member for the secondary winding circuit of the second induction motor being in substantially minimum impedance position, and motor means responsive to an operating quantity of said first and second motors for moving said movable members associated with said first and second motors towards minimum and maximum impedance positions, respectively.

4. In a system for controlling an induction motor over a given speed range, the combination of, a first induction motor having a primary winding and a variable impedance secondary winding circuit, a second induction motor having a primary winding and a variable impedance secondary winding circuit, each induction motor having a rotor, a shaft connecting the rotors, circuit connections for applying alternating current to the primary winding of the first induction motor to operate said first induction motor as a motor, circuit connections for applying direct current to the primary winding of the second induction motor to operate said motor as a load-absorbing alternating-current generator, a movable member for each secondary winding circuit for varying the impedance thereof, the movable member for the secondary winding circuit of the first induction motor being in substantially maximum impedance position and the movable member for the secondary winding circuit of the second induction motor being in substantially minimum impedance position, motor means responsive to an operating quantity of said first and second motors for moving said movable members associated with said first and second motors towards minimum and maximum impedance positions, respectively, and switch means responsive to a common operating quantity of said first and said second motors for interrupting said circuit connections for applying direct current to the primary winding of said second motor and establishing circuit connections for applying alternating current thereto.

5. In a system for controlling an induction motor over a given speed range, the combination of, a first induction motor having a primary winding and a variable impedance secondary winding circuit, a second induction motor having a primary winding and a variable impedance secondary winding circuit, each induction motor having a rotor, a shaft connecting the rotors, circuit connections for applying alternating current to the primary winding of the first induction motor to operate said first induction motor as a motor, circuit connections for applying direct current to the primary winding of the second induction motor to operate said motor as a load-absorbing alternating-current generator, a movable member for each secondary winding circuit for varying the impedance thereof, the movable member for the secondary winding circuit of the first induction motor being in substantially maximum impedance position and the movable member for the secondary winding circuit of the second induction motor being in substantially minimum impedance position, respective motor means responsive to respective operating quantities of said first motor for moving said movable members associated with said first and second motors towards minimum and maximum impedance positions, respectively; switch means responsive to a common operating quantity of said first and said second motors for interrupting said circuit connections for applying direct current to the primary winding of said second motor and establishing circuit connections for applying alternating current thereto, and load unbalance detector means responsive to the load unbalance between said first and said second motors for controlling the movable member associated with said second motor.

6. In a motor control system, the combination of, a pair of mechanically connected induction motors each having a primary winding and a variable impedance secondary winding circuit, circuit connections for applying alternating current to the primary winding of one induction motor, circuit connections for applying direct current to the primary winding of the second induction motor, and detector means responsive to an operating quantity of said first induction motor for controlling the variable impedance of the second induction motor.

7. In a motor control system, the combination of, a pair of mechanically connected induction motors each having a primary winding and a variable impedance secondary winding circuit, circuit connections for applying alternating current to both primary windings, speed control means driven by said motors for controlling the variable impedance means of the first motor, and control means responsive to the differential of the load currents of both motors for controlling the variable impedance means of the second motor.

8. In a motor control system, the combination of, a pair of mechanically connected induction motors each having a primary winding and a variable impedance secondary winding circuit, circuit connections for applying alternating current to both primary windings, speed control means for controlling the variable impedance means of the first motor, circuit means responsive to the electrical power delivered to the primary winding of the first motor for effecting a damping control on said speed control means, and control means responsive to the load current of said first motor for controlling the variable impedance means of said second motor.

9. In a motor control system, the combination of, a pair of mechanically connected induction motors each having a primary winding and a secondary winding, first and second variable impedance devices connected with the respective secondary windings, circuit connections for applying alternating current to the primary winding of the first motor, switch means operable in a first position to apply direct current to the primary winding of said second motor and operable in a second position to apply alternating current to the primary winding of said second motor, and a speed reference circuit for operating said switch means from said first to said second position.

10. An electric drive comprising, a pair of mechanically connected induction motors each having a primary winding and a secondary winding, first and second variable impedance devices connected with the respective secondary windings, circuit connections for applying alternating current to the primary winding of the first motor, switch means operable in a first position to apply direct current to the primary winding of said second motor and operable in a second position to apply alternating current to the primary winding of said second motor, and means responsive to the speed of said motors for operating said switch means from said first to said second position.

11. An electric drive comprising, a pair of mechanically connected induction motors each having a primary winding and a secondary winding, first and second variable impedance devices connected with the respective secondary windings, circuit connections for applying alternating current to the primary winding of the first motor, a motor speed responsive controller for controlling the first variable impedance, circuit connections for applying direct current to the primary winding of the second motor, and means responsive to the load current of the first motor for controlling the second variable impedance device.

12. In a motor control system, the combination of, a pair of mechanically connected induction motors each having a primary winding and a secondary winding, first and second variable impedance devices connected with the respective secondary windings, circuit connections for applying alternating current to the primary winding of the first motor, switch means operable in a first position to apply direct current to the primary winding of said second motor and operable in a second position to apply alternating current to the primary winding of said second motor, a speed reference circuit for operating said switch means from said first to said second position, circuit means responsive to the load of said first induction motor for controlling said second variable impedance means when said switch means is in said first position, and circuit means responsive to the difference in load between said first and said second motors for controlling said second variable impedance means when said switch means is in said second position.

13. Apparatus as recited in claim 12 in which said speed reference circuit comprises adjustable potentiometer means for controlling the first variable impedance device.

14. Apparatus as recited in claim 12 in which said speed reference circuit comprises adjustable potentiometer means for controlling the first variable impedance device, and means responsive to adjustment of said adjustable potentiometer means for controlling said switch means.

References Cited in the file of this patent

UNITED STATES PATENTS

| Number | Name | Date |
|---|---|---|
| 1,349,376 | Hellmund | Aug. 10, 1920 |
| 1,358,735 | Hellmund | Nov. 16, 1920 |
| 1,684,247 | Schiebeler | Sept. 11, 1928 |
| 1,719,855 | Schiebeler | July 9, 1929 |
| 1,755,079 | Schiebeler | Apr. 15, 1930 |
| 2,467,986 | Pell | Apr. 19, 1949 |